Patented Dec. 30, 1924.

1,521,233

UNITED STATES PATENT OFFICE.

MEYER J. DAVIDSEN, OF PARIS, FRANCE.

PRODUCTION OF OBJECTS OR BODIES FROM CEMENT OR CONCRETE.

No Drawing. Application filed October 2, 1924. Serial No. 741,277.

*To all whom it may concern:*

Be it known that I, MEYER J. DAVIDSEN, a subject of the King of Denmark, residing in Paris, France, have invented new and useful Improvements in the Production of Objects or Bodies from Cement or Concrete, of which the following is a specification.

It is the object of this invention to make possible the production of objects or bodies of cement or concrete which shall have greater strength and capacity for resistance than have been possible of attainment hitherto. In accordance with the invention the objects or bodies when molded from suitable wetted hydraulic cement alone or mixed with an aggregate to form concrete and allowed to stand until the cement has set or hardened, are baked in a suitable oven at a temperature which can be described generally as about that sufficient to fuse enamel, preferably about 800° C. The precise temperature at which the objects or bodies are baked may vary more or less with the ingredients of the cement, but a relatively high temperature, usually somewhere about 800° C., either lower or higher, will be found to give satisfactory results. After the baking the objects are cooled and may then be permitted to absorb moisture by being placed in water or moist air.

If the objects are formed of ordinary Portland cement, free lime may be formed in the mixture, under the high temperature at which the baking is carried on and the calcium silicates are so transformed that if the objects are subsequently placed in water they will disintegrate to some extent partly because of the formation of calcium hydrates and partly because the calcium silicates, which are necessary to the attainment of great strength, are not reformed. Therefore it is desirable to employ a cement formed in the usual way from a mixture which contains a relatively large proportion of alumina and a relatively small proportion of silica and lime. For example, the cement might be formed in the usual way from a mixture in which the silica, alumina, lime and iron ingredients would be relatively proportioned as follows; $SiO_2$, 10 parts; $Al_2O_3$, 40 parts; CaO, 40 parts, and $Fe_2O_3$, 10 parts. Articles molded from cement formed from such a mixture or from concrete consisting of such cement and an aggregate, allowed to set or harden, baked at a relatively high temperature, cooled and placed in water or moist air will be found to have attained a much greater degree of strength than could be attained without the baking.

If it is desired that the objects or bodies shall have a surface of inorganic enamel or glaze, they may be coated with the enameling or glazing mixture before they are baked and the enameling mixture be fused by the heat of the baking.

It will be understood that variations in the procedure, particularly as to the temperature employed, and in the character of the cement mixture employed may be varied somewhat under different conditions and that the invention, except as pointed out in the claims, is not restricted either to the precise procedure described or to the particular mixture suggested.

I claim as my invention:

1. The improvement in the manufacture of objects or bodies from cement or concrete which consists in molding the objects or bodies from wetted hydraulic cement or concrete, allowing them to become hard, and baking them at a relatively high temperature.

2. The improvement in the manufacture of objects or bodies from cement or concrete which consists in molding the objects or bodies from wetted hydraulic cement or concrete, allowing them to become hard, baking them at a relatively high temperature and permitting them to absorb moisture.

3. The improvement in the manufacture of objects or bodies from cement or concrete which consists in molding the objects or bodies from wetted hydraulic cement or concrete, allowing them to become hard, and baking them at a temperature sufficient to fuse enamel.

4. The improvement in the manufacture of objects or bodies from cement or concrete which consists in molding the objects or bodies from wetted hydraulic cement or concrete, allowing them to become hard, and baking them at a temperature of about 800° C.

5. The improvement in the manufacture of objects or bodies from cement or concrete which consists in molding the objects or bodies from wetted hydraulic cement or concrete containing a relatively large proportion of alumina and a relatively small proportion of silica and lime, allowing them to become hard, and baking them at a relatively high temperature.

6. The improvement in the manufacture of objects or bodies from cement or concrete which consists in molding the objects or bodies from wetted hydraulic cement or concrete containing a relatively large proportion of alumina and a relatively small proportion of silica and lime, allowing them to become hard, and baking them at a relatively high temperature and permitting them to absorb moisture.

7. The improvement in the manufacture of objects or bodies from cement or concrete which consists in molding the objects or bodies from wetted hydraulic cement or concrete containing a relatively large proportion of alumina and a relatively small proportion of silica and lime, allowing them to become hard, and baking them at a temperature sufficient to fuse enamel.

8. The improvement in the manufacture of objects or bodies from cement or concrete which consists in molding the objects or bodies from wetted hydraulic cement or concrete containing a relatively large proportion of alumina and a relatively small proportion of silica and lime, allowing them to become hard, and baking them at a temperature of about 800° C.

9. The improvement in the manufacture of objects or bodies from cement or concrete which consists in molding the objects or bodies from wetted hydraulic cement or concrete, allowing them to become hard, coating them with an enamel mixture, and baking them at a temperature sufficiently high to fuse the enamel mixture.

10. The improvement in the manufacture of objects or bodies from cement or concrete which consists in molding the objects or bodies from wetted hydraulic cement or concrete, allowing them to become hard, coating them with an enamel mixture, and baking them at a temperature of about 800° C.

This specification signed this 6th day of August, A. D. 1924.

MEYER J. DAVIDSEN.

Witnesses:
V. BELSCHNER,
E. KLEISDORFF.